United States Patent [19]
Farber

[11] 4,071,151
[45] Jan. 31, 1978

[54] VIBRATORY HIGH PRESSURE COAL FEEDER HAVING A HELICAL RAMP

[75] Inventor: Gerald Farber, Elmont, N.Y.

[73] Assignee: The United States of America as represented by the United States Department of Energy, Washington, D.C.

[21] Appl. No.: 744,474

[22] Filed: Nov. 24, 1976

[51] Int. Cl.² ............................................. C10J 3/30
[52] U.S. Cl. .............................. 214/35 R; 48/86 R; 202/262; 214/17 B; 214/18 R; 222/199; 222/325
[58] Field of Search ................. 214/17 B, 18 R, 35 R; 48/86 R; 198/757; 222/199, 325; 202/262

[56] References Cited

U.S. PATENT DOCUMENTS

| 3,146,918 | 9/1964 | Williams | 222/199 |
| 4,025,317 | 5/1977 | Gencsoy | 214/17 B X |

*Primary Examiner*—Robert G. Sheridan
*Attorney, Agent, or Firm*—Dean E. Carlson; Leonard Belkin

[57] ABSTRACT

Apparatus and method for feeding powdered coal from a helical ramp into a high pressure, heated, reactor tube containing hydrogen for hydrogenating the coal and/or for producing useful products from coal. To this end, the helical ramp is vibrated to feed the coal cleanly at an accurately controlled rate in a simple reliable and trouble-free manner that eliminates complicated and expensive screw feeders, and/or complicated and expensive seals, bearings and fully rotating parts.

5 Claims, 6 Drawing Figures

VIBRATORY HIGH PRESSURE COAL FEEDER HAVING A HELICAL RAMP

STATEMENT OF GOVERNMENT INTEREST

This invention was made in the course of, or under a contract with the United States Energy Research and Development Administration.

BACKGROUND OF THE INVENTION

In the field of energy production, there is a need for coal feeders. Currently, coal is fed to furnaces by screw feeders, but such devices are cumbersome, expensive, complicated, dirty or otherwise inefficient, or troublesome because they have required bearings and seals for fully rotating parts or an oil or sludge carrier. It is additionally advantageous to provide an accurately controlled feed rate, particularly when it is desired to feed coal to a high pressure, high temperature, reactor tube for producing fuel and other useful reaction products.

SUMMARY OF THE INVENTION

This invention provides an apparatus for feeding coal to a high pressure, heated reactor tube by the use of a vibratory feeder having a helical ramp.

More particularly, this invention provides apparatus for feeding coal at an accurately controlled rate to a feeder tube adapted to be connected to a high pressure, heated, reactor tube, comprising hopper means having top and bottom ends for receiving and transporting said coal in a first direction along a longitudinally extending axis; valve means for selectively closing the bottom end of said hopper means selectively to hold and selectively to release the coal along the axis for the flow of coal out the bottom of the hopper means past and around the valve means; pressure-tight housing means for selectively enclosing the hopper means in a closed pressurized space; container means in said closed pressurized space into which the bottom end of the hopper means extends, said container means having an inner surface forming a helical ramp along the wall thereof terminating at the upper end of said container means in a spout; feeder tube means connected through the bottom end of the high pressure housing means for receiving and transporting the coal from said spout; means for vibrating the container means to cause the coal continuously to move up the ramp in a stream at a predetermined selectively variable rate to spill out of the spout into the feeder tube at the same rate in accordance with the amplitude of the vibration of the container means; and means for supplying gas under pressure to the housing means for providing gas for the feeder tube for mixing with the coal means received thereby from the spout. It is also advantageous to measure the rate of coal flow out of the hopper.

With the proper selection of elements and their arrangement, as discussed in more detail hereinafter, the desired simple, reliable, trouble-free, and efficient feed is achieved.

OBJECTS OF THE INVENTION

It is an object of this invention, therefore, to provide a simple reliable apparatus and method for cleanly feeding powdered coal into a high pressure, heated, reactor tube at an accurately controlled rate for hydrogenating the coal substantially without complicated and expensive bearings or fully rotating seals.

The above and further novel features and objects of this invention will be understood in more detail from the following detailed description of one embodiment when read in connection with the accompanying drawings, and the novel features will be particularly pointed out in the appended claims.

BRIEF DESCRIPTION OF THE DRAWINGS

In the figures, where like elements are referenced alike.

DESCRIPTION OF THE PREFERRED EMBODIMENT

The feeder of this invention is particularly useful in hydrogenating coal by feeding powdered coal to a high pressure hydrogen containing, heated reactor tube at an accurately controlled rate. However, this invention is also generally useful more broadly in applications requiring the feeding of various powdered solids at an accurately controlled, selectively variable rate to high pressure containers.

Figure 1:
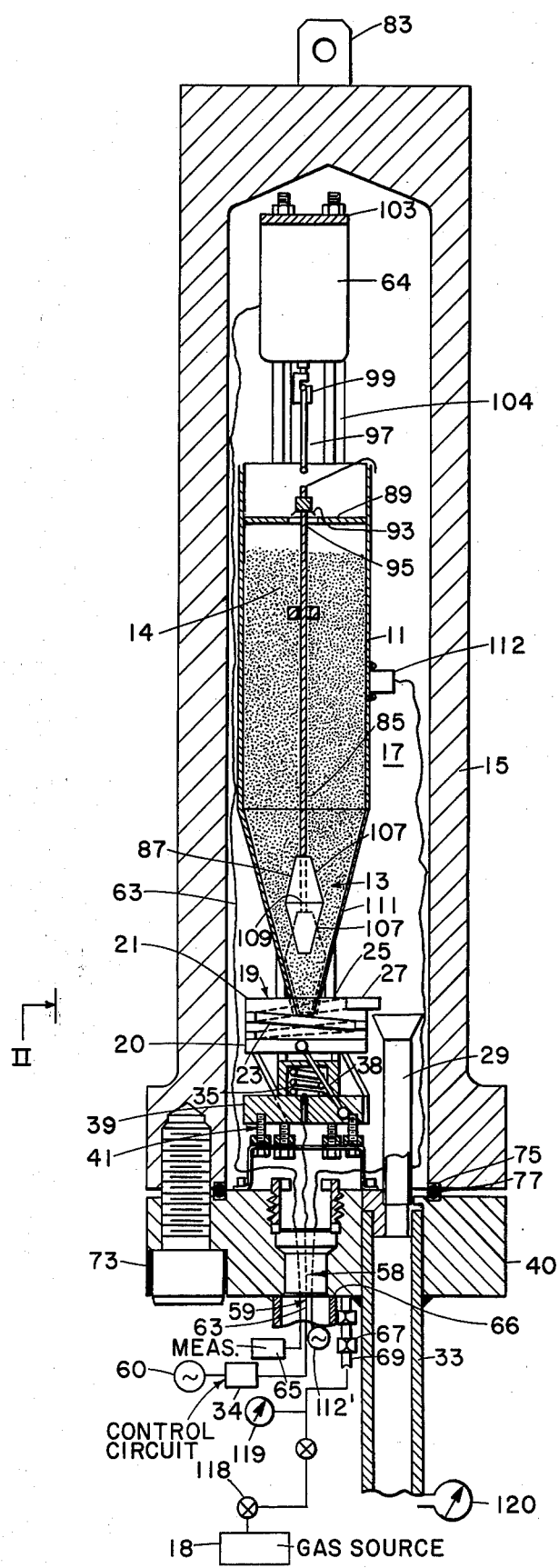
FIG. 1 is partial cross-section of one embodiment of the feeder apparatus of this invention.
Figure 2:
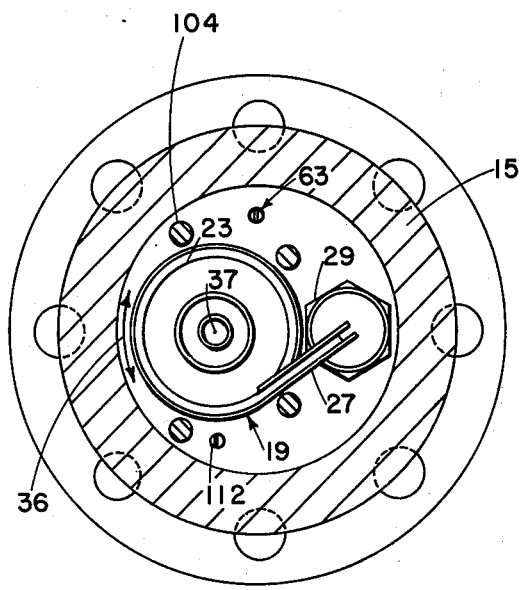
FIG. 2 is a partial cross-section of FIG. 1 through II—II.
Figure 3:
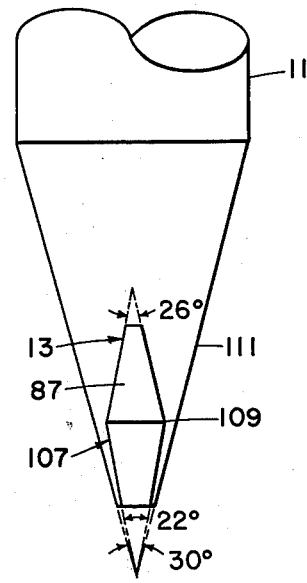
FIG. 3 is a partial schematic view of the valve of FIG. 1.
Figure 4:
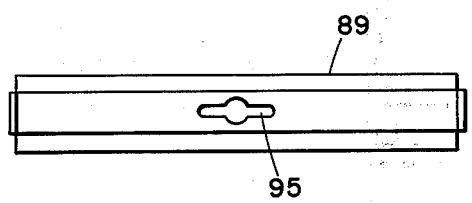
FIG. 4 is a partial top view of the support for the valve of FIG. 3.
Figure 5:
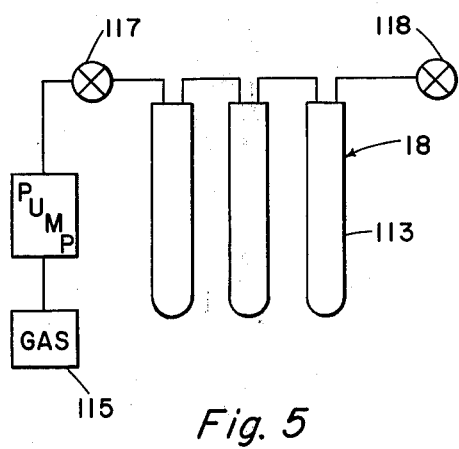
FIG. 5 is a partial schematic view of the gas source means for the apparatus of FIG. 1.
Figure 6:
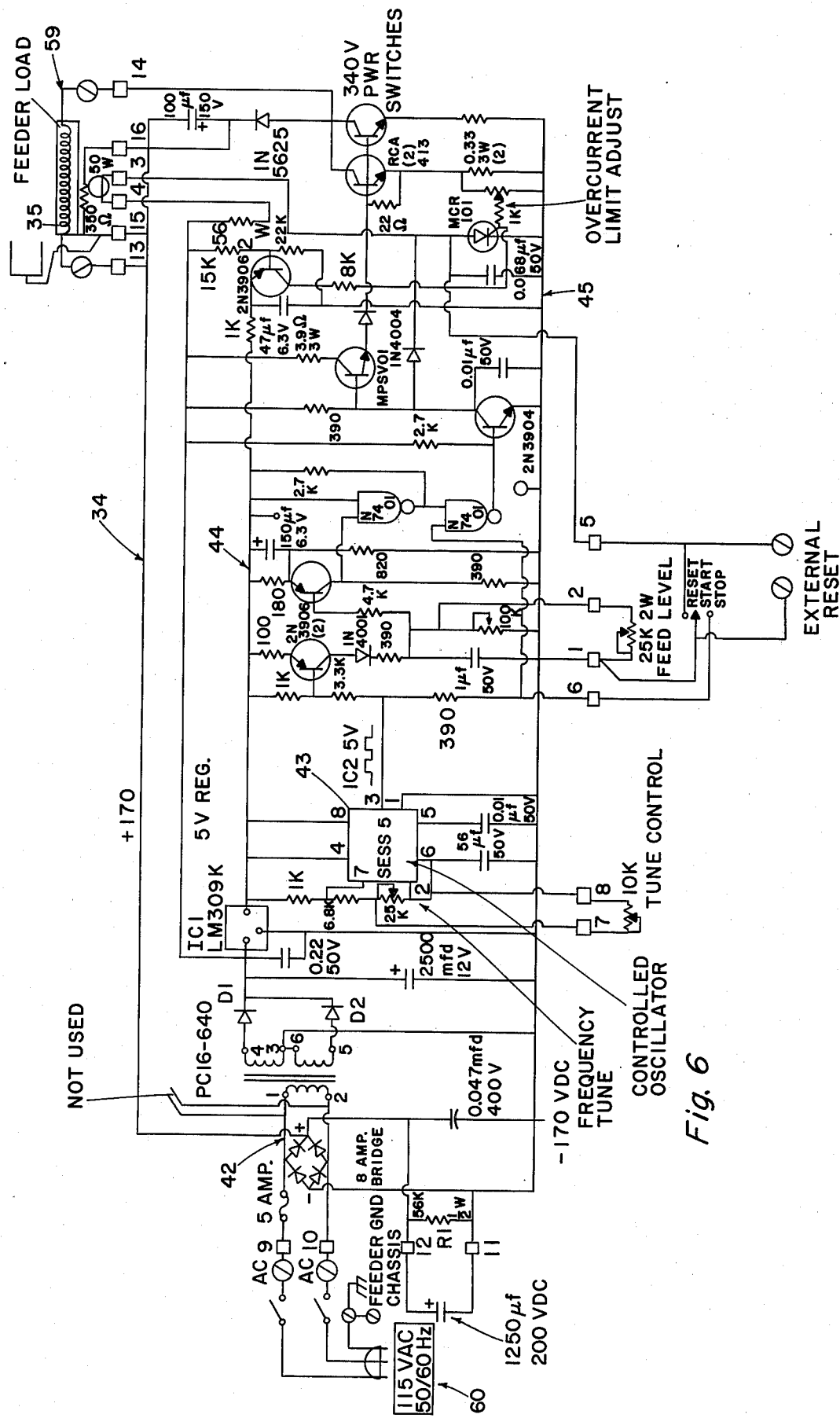
FIG. 6 is a partial circuit diagram for the control for the apparatus of FIG. 1.

Referring to FIGS. 1 and 2, which are a partial cross-section and a top view of the helical coal feeder of this invention, the main elements comprise a hopper means 11 having a valve means 13 for feeding coal 14 out the bottom thereof, as shown in detail in FIGS. 3 and 4, a housing means 15 enclosing the hopper means in a space 17 adapted to be pressurized from a gas source 18, such as shown in FIG. 5, and a vibratory container means 19 having an iron armature 20 and a bowl 21 forming a helical ramp 23 terminating at its upper end 25 in a spout 27 that spills the coal into a feeder tube 29 passing through the bottom of the housing means where the latter is connected to a high pressure reactor tube 33. FIG. 6 illustrates one circuit 34 for electro-magnetic vibration of the bowl 21.

The container means 19 has an electro-magnetic solenoid means 35 and an actuating circuit 34, which is shown in FIG. 6, for vibrating the container means to spill the coal out of spout 27 at a predetermined, selectively variable rate by vibrating the bowl at a predetermined fixed frequency along a selectively variable length arc 36 (FIG. 2) at different accelerations in opposite directions. To this end, the solenoid twists the bowl 21 around an axis of rotation 37 (FIG. 2) in one direction at a first acceleration, and suitable leaf springs 38 twist the bowl back in the opposite direction at a different acceleration. Here, the variation in the length of the arc of twisting, i.e., the variation in the vibration amplitude, selectively adjusts the feed rate.

The solenoid means 35, is energized by an AC, circuit 34, as will be understood from FIG. 6, or a pulsating DC voltage. The magnetic field thus created pulls down the armature and the container means 19, which is supported by springs 38 that are evenly spaced around the periphery of the armature. Since the springs are set at a predetermined angle (not 90°) to the armature, energizing the solenoid will give it a twisting motion at a first acceleration or rate. At the end of the voltage cycle, the armature is released and the springs return the armature to its original position, but at a different slower acceleration or rate. Any particulate matter in the bowl 21 will be caused by centrifical force to vibrate up the ramp clockwise and over the spillway formed by spout 27 when the solenoid is energized to twist the bowl counterclockwise.

The leaf springs and the solenoid lend themselves to a simple trouble-free system for vibrating the container means back and forth around a vertical axis of rotation along the described selectively variable length arc in a dirty coal containing ambient at the desired resonant frequency substantially without fully rotating parts or complicated or expensive bearings and seals. To this end, one end of the springs rigidly attaches to the magnet armature on the bottom of the container means bowl, and the other end rigidly attaches to a solenoid case 39, which advantageously encapsulates the solenoid in epoxy resin or the like and is attached to the base 40 by suitable screws 41.

The electronic control circuit 34 for the feeder solenoid comprises a regulated DC power supply 42, control oscillator 43, power amplifier 44 and amplitude controller overload circuit 45, as shown in FIG. 6. The regulated power supply feeds all components in the circuit. The control oscillator varies the frequency so that the vibrating container means 19, which has it's own natural resonance, can be tuned to vibrate efficiently. The amplitude controller sets the feed rate. The power amplifier takes both of the above signals and amplifies them to a voltage high enough to drive the container means feeder, while the overload circuit shuts off the amplitude controller and control oscillator should the circuit be driven too hard, or if a short occurs.

This electronic controller is not essential for the performance of the vibrating feeder. A simple voltage controller works well. However, the vibrating feeder has its own resonant frequency (weight of the armature plus the container, and the stiffness of the springs) that has to be tuned to 60 cycle AC or the pulsating DC. So rather than tune by adding or removing springs and changing magnetic gap, its much easier to use a controller with a variable frequency. Once the resonant frequency is found it can be locked in, and the only adjustment needed for feed rate control is amplitude.

All leads 58, such as the current leads 59 for the solenoid 35 from source 60, as well as the leads 63 to a load cell 64, which is connected to a digital measuring meter 65, pass through a pressure-tight hermetically sealed fitting 66 at the bottom of the base 40 and adjacent to a pressure tight-fitting 67 for a tube 69 for the gas pressure source 18. The load cell is connected to the digital read-out meter 65 for continuously accurately measuring the rate of coal flow through the hopper means to the container means, and this measurement is directly proportional to the feed rate to the reactor tube during the time the hopper is feeding coal to the container means.

A suitable bolt circle 73 selectively opens and closes the housing means 15 against an elastic O-ring seal 75 that is arranged in an O-ring seal groove 77 to withstand a pressure-differential across the seal.

To initiate a feeding cycle for feeding the coal 14 into the reactor tube, the bolts in bolt circle 73 unscrew to separate the housing means 15 from its base 40. The lifting eye 83 acts to support the housing while coal 14 loads into the hopper to a predetermined level from a suitable source (not shown). At this time the stem 85 of the double-cone shaped plug 87 of valve 13 locates the plug at the bottom of the hopper to close the bottom end thereof when loading or to carry it. Also, the hopper is disconnected from the load cell 64 during the loading of the hopper. By twisting the valve stem 85 in a supporting bracket 89 that spans the inside of the hopper, the stem guide 93 mates with and moves up through a slot 95 in the bracket to open the valve.

After filling to a desired level above the container means, the full hopper is again hung from the load cell 64 on a triangular-shaped hanger 97 that is hooked into the sides of the hopper perpendicular to the bracket 89 and onto a hook 99 connected to the bottom of the load cell 64 which is supported from a plate 103 connected to four rods 104 extending to the bottom housing plate base 40, so that the bottom of the hopper extends into the bowl 21 of the container means.

Partially filling the bowl formed by the container means to a level corresponding to the level of the bottom of the hopper maintains the coal level in the bowl intermediate the bottom and the top of the helical ramp 23. A level of coal in the container means at the same height as the bottom end of the hopper maintains the coal at the desired substantially uniform level until the hopper is empty. To this end, the coal 14 flows out the bottom end of the hopper at a rate up to a rate exceeding the maximum rate that the coal flows from the container means into the spout and the feeder tube whenever the coal in the container means falls below that level. This function, as described herein, thus permits the coal feed rate up the ramp and from the spout into the feeder tube to be independent of the coal head in the hopper.

The valve plug 87 has a special shape relative to the inside wall of the hopper to keep the coal flowing smoothly out of the bottom of the hopper. Thus, the plug has the shape of two cones 107 joined at a common base 109 (FIGS. 1 and 3), and the bottom, or inverted cone, has an angle less than the top cone angle and less than the angle made by the bottom chute portion 111 of the hopper, while the top cone angle is intermediate the bottom cone angle and the angle of the bottom chute of the hopper, as understood from the herein below described examples. To insure that the powdered coal doesn't stick in the hopper a small solenoid rapper 112 on the outside of the hopper is fed from a suitable source through the gas and pressure tight electrical feed-through fitting 66 at the bottom of the bottom base 40 of the housing means 15, and is actuated only if needed from source 112'.

The pressure tight fitting 67 connects to a gas source 18 consisting of a plurality of parallel connected gas bottles 113 (FIG. 5) containing gas under pressure from a suitable high pressure low flow source 115. By selectively opening valves 117 and 118, the desired gas from source 115 is stored in bottles 113 for maintaining the desired pressure in the space 17 in the housing means 15, and the corresponding desired flow of gas and coal down the feeder tube, as indicated by gages 119 and 120 and the load cell 63 at a uniform constant rate in accordance wth the vibration amplitude of the container means.

In operation, the coal is fed at the desired accurate rate into a feeder tube containing high temperature high pressure hydrogen to hydrogenate the coal into useful gaseous and liquid fuels and other products by continuously vibrating the container means bowl having the helical ramp at a predetermined frequency and a selectively variable amplitude for effecting the feeding of the coal up the ramp at a first rate from a first height in the bowl to a second higher height at the spout, from whence the coal falls to a third lower height in the feeder tube below the first height.

Meanwhile, coal at a first level in the hopper above the first height is independently fed at a second rate determined by the bottom opening of the hopper to be up to a rate that exceeds the rate spilled from the spout 27, and this independently fills the bowl of the container means to a level equal to the height of the bottom of the hopper. Thus, when the coal in the bowl falls below a predetermined level equal to the height of the bottom of the hopper, which is between the first and second heights at the bottom and top of the ramp respectively, the coal comes out of the hopper to maintain the level of the coal in the container means at the desired predetermined level at the bottom of the hopper independently of rate the coal spills out of the spout. This latter rate is determined independently of the feed rate from the hopper by selectively continuously variably effecting a predetermined vibration amplitude of the bowl while maintaining the desired uniform resonance frequency of these vibrations regardless of changes in amplitude. Thus, this invention selectively effects a predetermined feed rate to and from the spout, as well as the high pressure reactor tube in accordance with the amplitude of the vibrations.

While the frequency and amplitude of the vibrations can be controlled by conventional circuit apparatus, the circuit apparatus of FIG. 6 is advantageously used by adding a 110 V source across the input to the transformer shown. All the resistors are ¼ w, 5% carbon unless otherwise noted; all the diodes are 4001, unless otherwise noted. The basic circuit apparatus is provided by Vibra-Metrics, Inc., 150 Bradley St., East Haven, Conn.

Advantageously, the respective feed rates, pressures, vibration frequencies and amplitudes, which are measured remotely, automatically, are all selectively adjustable remotely for producing uniform, constant, predetermined values. To this end, the feeder employs a remotely controlled solenoid that produces the desired horizontal vibration frequency and amplitude.

The following are examples:

EXAMPLE I

The coal is fed to a 1 inch I.D. reactor tube at about 1½ – 5 grams/min. at a linear velocity of up to about 4 ft/sec. per lb. of $H_2$, the coal having a residence time of about 22 sec. in falling through the reactor tube, the char and ash being collected at the bottom of the reactor tube.

The coal used is 100° C vacuum dried lignite that is ground and passed through a 200 mesh screen to give an average coal size of 100 – 150 $\mu$ across the coal particles.

The hopper supplies powdered coal to the vibratory container means and is suspended from a load cell to monitor feed rate, and weight loss independent of bulk density. The load cell is a strain gage that has a regulated electrical signal sent to it, and detects any change of resistance caused by weight gain or loss. The integrated signal is continuously read out on a digital display meter in grams.

A pressure of 1500 – 5000 psi hydrogen is normally used in the coal hydrogenation experiments. To this end, a bank of high pressure bottles is kept at 6000 psi by a pump. The regulation of the gas flow is divided in two, one going to a preheater, the other going cold to the feeder. There is a flow of cold gas down through the feeder to prevent damage to the solenoid.

The temperature in the reactor tube is 600° – 800° C, and the pressure in the feeder housing means is slightly higher to cause a positive flow of coal and cold gas from the feeder tube into the reactor tube.

It was found that it is only necessary to have a tube to equalize the pressure from feed to reactor because the pressure vessel covering the feeder is dead ended, and the cold gas flow must be down through the feeder throat.

The hopper is loaded with several pounds of coal to a level above the top of the helical ramp in the bowl of the container means.

The cone angles of the valve plug are 26° for the top cone, 22° for the bottom inverted cone, and 30° for the bottom chute portion of the hopper. These angles were critical to the most uniform flow over a wide range of flow rates.

The full hopper is hung from load cell and the hopper valve is opened to pour coal into the bowl of the container means to a level midway between the top and bottom of the bowl, which level is equal to the height of the bottom of the bottom chute portion of the hopper.

Then the pressure tight housing is provided to cover the feeder and to pressurize the system prior to hydrogenation.

EXAMPLE II

The steps of Example I are repeated using a gas flow in an 8 ft. long, 1 inch I.D. reactor tube of between 1 – 2 ft/sec. and 15 to 30 ft/sec. at 100 – 350 atmospheres pressure. About 10% of the gas flow is through the feeder tube, which is unheated, and 90% of the gas flow, which is heated, by-passes the feeder tube by going directly into the reactor tube.

The frequency of vibration of the container means bowl is constant and the amplitude is selectively variable to produce the desired uniform, selectively variable, alternate, periodic, arc length of twist.

The coal feeder is mounted on the flange of an autoclave pressure vessel. The bell can be removed with a hoist that is attached to the ceiling of the works area, allowing access for coal loading etc.

The hopper support frame is bolted to the base flange and this frame supports both the load cell and the hopper that hangs from it.

The coal hopper is made of light gage sheet metal which has a spider at the top end to support the cone valve.

The free flow cone valve, has a metal conical section that enhances coal flow, and can also be lowered if the hopper is to be removed to prevent coal from flowing.

The vibratory feeder is remotely controlled for feed rate. As the coal level drops to below the hopper nozzle more coal is fed in keeping the level constant. The feed rate is not dependent on the hopper coal level, but only on the desired voltage amplitude driving the vibratory feeder.

The load cell and digital readout transducer indicator automatically weigh the coal supply before and during a run.

The hermetic electrical seal seals all electrical supplies and signals are made at this point. A high pressure multi-contact fitting is used.

At the hydrogen inlet a slightly higher pressure is fed to the feeder housing than is fed to the preheater and reactor tube, so that there will be gas flow down the feeder tube for cooling and to prevent possible hot convection currents from entering the feed area.

EXAMPLE III

The steps of Example II are repeated using the following items of equipment:

a. model EB-MA vibratory elevator motor from the FMC Corporation;

b. the basic motor control is model T 1C-2B from Vibra-metrics Corporation, East Haven, Conn.;

c. the load cell model is 450 Type U 3 PL1, having a digital meter model 450;

d. suitable chromatographic analysis is used for determining the products produced by hydrogenization of the coal in the reaction tube.

The parameters are given in the following table:

TABLE 1

PROCESS DESIGN CONDITIONS

1. Reactor pressure $\leq$ 4000 psig
2. Reactor temperature $\leq$ 800° C
3. Coal feed rate $\leq$ 1 lb/hr
4. $H_2$ feed rate $\leq$ 10 lb/hr
5. $H_2$ vol/lb mole = 380 ft$^3$ at STP
6. Cp coal = 0.34 Btu/lb-° F
7. Cp $H_2$ = 3.5 Btu/lb-° F
8. Coal particle size — $\leq$ 150 microns
9. Coal density — 90 lb/ft$^3$
10. Coal bulk density as used — 24 lb/ft$^3$
11. Char bulk density — 15 lb/ft$^3$
12. Volume of 6000 psi cylinder — 480 SCF = 2.55 lb $H_2$
13. Volume of 2000 psi cylinder — 200 SCF = 1.06 lb $H_2$
14. Compressor capacities at 6000 psi discharge

| Suction Pressure (PSI) | $H_2$ Capacity (lb/hr) |
| --- | --- |
| 2000 | 13 |
| 1500 | 11.5 |
| 1000 | 8.6 |
| 500 | 2.7 |
| 400 (min) | 1 |

15. Yield strength of Inconel 601 used in preheater — 26,000 psi at 800° C
16. Yield strength of Inconel 617 used in reactor — 28,000 psi at 800° C This invention has the advantages of providing a method and apparatus having a vibrating helical ramp for supplying an accurately controlled selectively adjustable feed rate for dirty powdered coal with substantially no complicated and expensive rotating parts. Moreover, simple, inexpensive seals are employed with pressures up to over 5000 psi. Furthermore, the hopper coal supply rate is independent of the feed rate of the feeder bowl of this invention, and automatically maintains the desired uniform coal level and height in the feeder bowl. Still further, many inexpensive and available parts are employed for ease of operation, maintenance and assembly.

What is claimed is:

1. Apparatus for feeding coal at an accurately controlled rate to a feeder tube adapted to be connected to a high pressure, heated, reactor tube, comprising:
    a. hopper means having top and bottom ends for receiving and transporting said coal in a first direction along a longitudinally extending axis;
    b. valve means for selectively closing the bottom end of said hopper means selectively to hold and selectively to release the coal along the axis for the flow of coal out the bottom of the hopper means past and around the valve means;
    c. pressure-tight housing means for selectively enclosing the hopper means in a closed pressurized space;
    d. container means in said closed pressurized space into which the bottom end of the hopper means extends, said container means having an inner surface forming a helical ramp along the wall thereof terminating at the upper end of said container means in a spout;
    e. feeder tube means connected through the bottom end of the high pressure housing means for receiving and transporting the coal from said spout;
    f. solenoid means for vibrating the container means to cause the coal continuously to move up the ramp in a stream at a predetermined, selectively variable rate and from the ramp to spill out of the spout into the feeder tube at the same rate in accordance with the amplitude of the vibration of the container means;
    g. means for supplying gas under pressure to the housing means for providing gas for the feeder tube for mixing with the coal means received thereby from the spout; and
    h. means for measuring the rate of coal flow through the hopper means.

2. The apparatus of claim 1 in which the container means has mounted thereon leaf springs rigidly connected at one end thereto; and solenoid means having a casing to which the other end of the leaf springs are rigidly attached; and the solenoid has signal supply means for periodically energizing the solenoid to a uniform peak amplitude in a cycle at a fixed frequency to twist the container means back and forth at different velocities in a small arc centered on an axis of rotation with an arc length corresponding to the uniform peak amplitude of the signal supply means to cause the coal to climb up the helical ramp and to feed the spout at a uniform constant rate determined by the uniform peak amplitude of the signal supply means at said fixed frequency.

3. The apparatus of claim 1 in which the means for supplying the gas under pressure to the pressure-tight housing means has a plurality of parallel connected gas bottles containing hydrogen at up to 6000 psi for flowing hydrogen under positive pressure with the coal means through the feeder tube means, and said gas bottles have a high pressure low flow rate hydrogen source.

4. The apparatus of claim 1 in which the valve means has a double-conical shape from a common base through its mid-plane to form a top cone angle of 26° and an inverted bottom cone angle of 22°;

said hopper means having an inverted cone-shaped bottom end forming an inverted cone angle of 30° for the flow of the coal out the bottom of the hopper means past and around the valve means.

5. The apparatus of claim 4 having means connected to the hopper means in operable association with the valve means for holding the valve means open and for releasing the valve means by the rotation thereof for closing the valve means against the cone-shaped bottom end of the hopper means for selectively holding the coal in the hopper means.

* * * * *